United States Patent [19]

Imaseki et al.

[11] Patent Number: 4,921,060
[45] Date of Patent: May 1, 1990

[54] INTEGRATED ROLL RIGIDITY AND DIFFERENTIAL SLIP CONTROL SYSTEM

[75] Inventors: Takashi Imaseki; Yuji Kobari, both of Zushi, Japan

[73] Assignee: Nissan Motor Co., Ltd., Yokohama, Japan

[21] Appl. No.: 251,169

[22] Filed: Sep. 28, 1988

[30] Foreign Application Priority Data

Oct. 2, 1987 [JP] Japan .............................. 62-249200

[51] Int. Cl.⁵ ............................................ B60G 12/00
[52] U.S. Cl. ...................................... 180/41; 280/691; 280/91; 280/707; 475/86
[58] Field of Search ....................... 280/6.1, 6.11, 688, 280/691, 91, 707; 180/41, 233, 234; 74/711

[56] References Cited

U.S. PATENT DOCUMENTS

| | | | |
|---|---|---|---|
| 3,264,900 | 8/1966 | Hartupee | 74/711 |
| 3,362,258 | 1/1968 | Thornton | 74/711 |
| 3,402,796 | 9/1968 | Mieras | 192/107 |
| 3,724,289 | 4/1973 | Kennicutt | 74/711 |
| 3,837,236 | 9/1974 | Kagata | 74/711 |
| 3,906,812 | 9/1975 | Kagata | 74/711 |
| 4,583,424 | 4/1986 | von Hiddessen et al. | 74/710.5 |
| 4,644,823 | 2/1987 | Mueller | 74/710.5 |
| 4,650,212 | 3/1987 | Yoshimura | 280/707 |
| 4,679,463 | 7/1987 | Ozaki et al. | 74/711 |
| 4,741,407 | 5/1988 | Torii et al. | 180/76 |
| 4,749,210 | 6/1988 | Sugasawa | 280/707 |
| 4,757,870 | 7/1988 | Torii et al. | 180/233 |
| 4,797,823 | 1/1989 | Ikemoto et al. | 280/707 |

FOREIGN PATENT DOCUMENTS

| | | |
|---|---|---|
| 0033204 | 8/1981 | European Pat. Off. . |
| 64669 | 11/1982 | European Pat. Off. . |
| 0231025 | 8/1987 | European Pat. Off. . |
| 3025282 | 2/1982 | Fed. Rep. of Germany . |
| 3040120 | 4/1982 | Fed. Rep. of Germany . |
| DE 3609396 A1 | 10/1986 | Fed. Rep. of Germany . |
| DE 3637820 A1 | 5/1987 | Fed. Rep. of Germany . |
| 58-221046 | 12/1983 | Japan . |
| 60-179330 | 9/1985 | Japan . |
| 61-102320 | 5/1986 | Japan . |
| 62-103226 | 5/1987 | Japan . |
| 62-103227 | 5/1987 | Japan . |
| 797921 | 4/1979 | U.S.S.R. . |
| 1110967 | 4/1983 | U.S.S.R. . |
| 1379416 | 1/1975 | United Kingdom . |
| 2102907 | 2/1983 | United Kingdom . |
| 2104178 | 3/1983 | United Kingdom . |

Primary Examiner—Richard A. Bertsch
Attorney, Agent, or Firm—Foley & Lardner, Schwartz, Jeffery, Schwaab, Mack, Blumenthal & Evans

[57] ABSTRACT

An integrated roll rigidity and differential slip control system for a wheeled vehicle comprises roll rigidity changing means for changing roll rigidity distribution to front and rear wheel sides, roll rigidity control means for controlling the operation of said roll rigidity changing means based on vehicle running conditions, a differential interposed between the rear wheels, clutch means for supplying a slip limiting force to the differential to limit differential action thereof, and slip control means for controlling engagement of the clutch means based on vehicle running conditions and integrated control means for controlling, in preference to the control by the roll rigidity control means, the roll rigidity distribution in such a way that a roll rigidity is larger on the front wheel side and smaller on the rear wheel side in response to a cornering condition in which a driving force is distributed more to a cornering outside driving wheel than to a cornering inside driving wheel.

7 Claims, 3 Drawing Sheets

INTEGRATED ROLL RIGIDITY AND DIFFERENTIAL SLIP CONTROL SYSTEM

BACKGROUND OF THE INVENTION

1. Field of the Invention

The present invention relates in general to a wheeled vehicle equipped with a roll rigidity control device and a slip control device for a differential, and more particularly to an integrated control system for a roll rigidity control device and a slip control device for a differential.

2. Description of the Prior Art

A known slip control device for a differential includes a hydraulically operated friction clutch unit which is variably engaged for varying a differential action as disclosed in Japanese Provisional Patent Publication Nos. 62-103226 and 62-103227.

In order to retain a sufficient supply of a driving force to the driving wheels during cornering of the vehicle, it is desirable for the friction clutch unit to be engaged more strongly, i.e., it is desirable to increase a slip limiting force (i.e., force supplied to the friction clutch unit to limit a slip thereof and therefore a differential action) during cornering of the vehicle.

When the slip limiting force is maintained high, it becomes possible to drive the vehicle, when cornering, in a power slide running state where the vehicle is subjected to a high lateral acceralation.

However, in a vehicle equipped with a so-called suspension which is capable of varying the roll rigidity in addition to the above described slip control device, the slip limiting force control by the slip control device and the roll rigidity control by the roll rigidity control device are performed independently and have no relation to each other. Due to this, at the initial stage of vehicle cornering in a power slide running state in which the slip limiting force is maintained high to prevent the differential movement of the driving wheels, a tendency of far strong understeer results.

With a view to reducing the tendency to understeer at the initial stage of such cornering, the assignee of this application has heretofore proposed a control device for controlling, at the initial stage of cornering, the distribution of the roll rigidity to the front and rear wheels in such a way that the roll rigidity is smaller on the front wheel side and larger on the rear wheel side as disclosed in the Japanese Patent Application 61-114269.

This control device is effective for reducing the tendency to understeer at the initial stage of cornering. However, as the magnitude of roll increases after the initial stage, the cornering inside wheel is lifted above the road surface, thus causing a reverse steering state of changing a vehicle steering characteristic from understeer to oversteer. Due to this, an excessive oversteer may result if the distribution of the roll rigidity is maintained in an oversteer effecting state, i.e., in such a state that the distribution of roll rigidity is smaller on the front wheel side and larger on the rear wheel side.

SUMMARY OF THE INVENTION

In accordance with a present invention, there is provided a novel method of controlling roll rigidity and differential slip for a wheeled vehicle. The vehicle has a roll rigidity control device for variably controlling roll rigidities on front and rear wheel sides and a slip control device for a differential for variably controlling a slip limiting force to be supplied to the differential to limit a differential action thereof. The method comprises the steps of detecting that a driving force is distributed more to a cornering outside driving wheel than to a cornering inside driving wheel during cornering of the vehicle and supplying a command to the roll rigidity control device for changing roll rigidity distribution in such way that a roll rigidity is larger on the front wheel side and smaller on the rear wheel side.

In accordance with the present invention, there is further provided an integrated roll rigidty and differential slip control system which comprises a set of steerable front wheels, a set of steerable rear driving wheels, roll rigidity changing means for changing roll rigidity distribution to the front and rear wheel sides, roll rigidity control means for controlling the operation of the roll rigidity changing means based on vehicle running conditions, a differential interposed beween the rear wheels, clutch means for supplying a slip limiting force to the differential to limit a differential action thereof, and slip control means for controlling engagement of the clutch means based on vehicle running conditions and integrated control means for controlling, in preference to the control by the roll rigidity control means, the roll rigidity distribution in such a way that roll rigidity is larger on the front wheel side and smaller on the rear wheel side in response to a cornering condition in which a driving force is distributed more to a cornering outside driving wheel than to a cornering inside driving wheel.

The above method and system are effective for solving the above noted problems inherent in the prior art device.

It is accordingly an object of the present invention to provide an integrated roll rigidity and differential slip control system which can prevent, when cornering in a power slide running state or a like critical state, an excessive oversteer and thereby improve the controllability of the vehicle.

It is another object of the present invention to provide an integrated roll rigidity and differential slip control system of the above described character which can improve the controllability without reducing the driveability of the vehicle.

It is a further object of the present invention to provide an integrated roll rigidity and differential slip control system which makes it possible to drive the vehicle safely even when cornering in a critical state.

It is a further object of the present invention to provide an integrated roll rigidity and differential slip control system of the above described character which can sufficiently supply a driving force to the driving wheels without deteriorating the controllability of the vehicle.

It is a further object of the present invention to provide an integrated roll rigidity and differential slip control system of the above described character which is desirable and useful from the safety driving point of view.

It is a further object of the present invention to provide a novel method of controlling roll rigidity and differential slip which is of the above described character.

DESCRIPTION OF THE PREFERRED EMBODIMENTS

Figure 1:
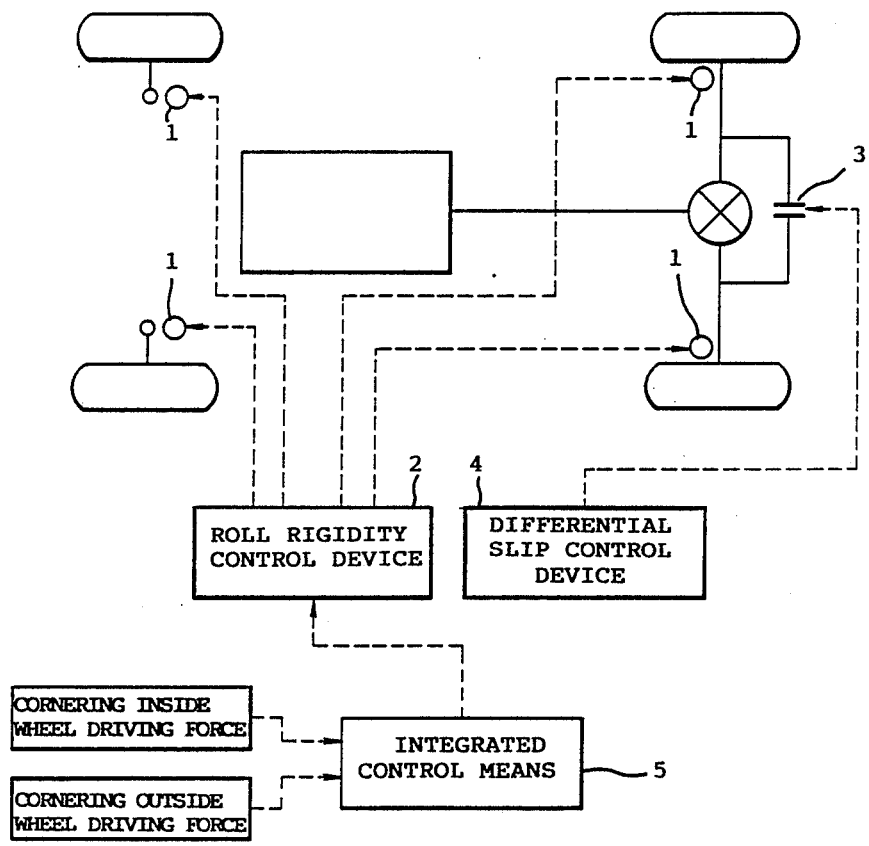
FIG. 1 is a diagramatic view of an integrated roll rigidity and differential slip control system according to an embodiment of the present invention.

Referring first to FIG. 1, a vehicle is shown as being provided with a roll rigidity changing means 1 operative to change the roll rigidities of front wheels and rear driving wheels (no numeral), a roll rigidity control unit 2 operative to variably control the roll rigidities of the front and rear wheels by controlling the operation of the roll rigidity changing means 1, a clutch unit 3 operative to produce a slip limiting force for limiting a differential action between the rear driving wheels and a slip control unit 4 for a differential operatively connected with the clutch unit 4 for variably controlling the slip limiting force. The vehicle is further provided with an integrated roll rigidity and differential slip control unit 5 operative to detect a vehicle cornering condition in which a driving force is distributed more to a cornering outside rear driving wheel than to a cornering inside rear driving wheel and producing a signal representative thereof, which signal is supplied to the roll rigidity control unit 2 for changing, by the operation of the roll rigidity changing means 1, the distribution of the roll rigidity to the front and rear wheels in such a way that the roll rigidity is larger on the front wheel side and smaller on the rear wheel side.

In operation, when such a cornering condition is caused by power sliding running or the like in which a driving force is distributed more to a cornering outside driving wheel than to a cornering inside driving wheel, the integrated roll rigidity and differential slip control unit 5 supplies a command to the roll rigidity control unit 2 for changing, by the operation of the roll rigidity changing means 1, the distribution of the roll rigidity to the front and rear wheels in such a way that the roll rigidity is larger on the front wheel side and smaller on the rear wheel side.

Accordingly, by the above roll rigidity control the vehicle is subjected to a larger cornering force on the rear wheel side as compared with the front wheel side, thus being urged to cover a larger cornering curve, i.e., being subjected to a moment that urges the vehicle to understeer. On the other hand, by the distribution of a larger driving force to the cornering outside driving wheel the vehicle is subjected to a moment that urges the vehicle to oversteer. The above moments offset each other, thus preventing an excessive oversteer during critical cornering for thereby making it possible to improve the controllability of the vehicle.

Figure 2:
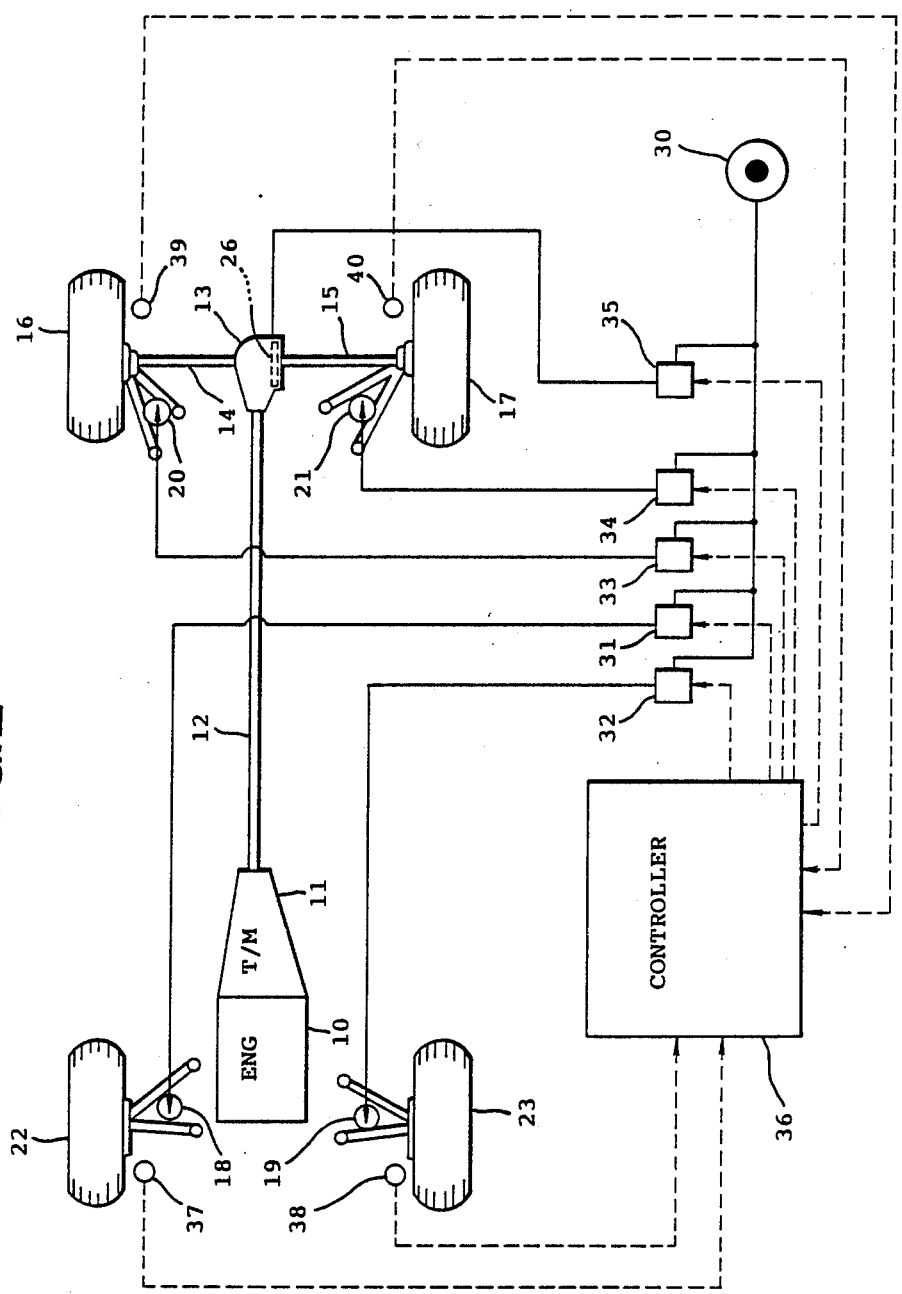
FIG. 2 is a schematic view of a front enginerear drive vehicle incorporating an integrated roll rigidity and differential slip control system according to another embodiment of the present invention.
Figure 3:
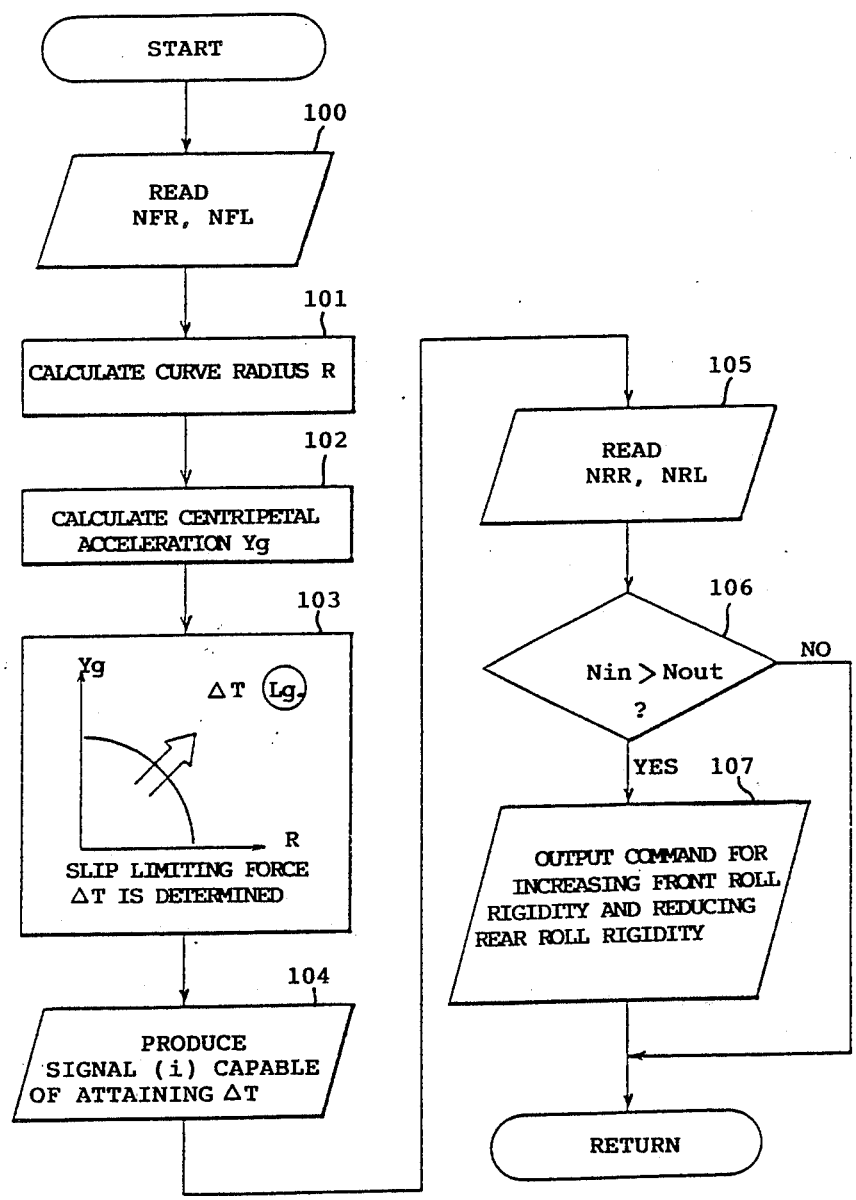
FIG. 3 is a flow chart depicting a computer program for a controller employed in the integrated control system of FIG. 2.

Referring to FIGS. 2 and 3, an integrated roll rigidity and differential slip control system according to another embodiment of the present invention is shown as being applied to a front engine-rear drive vehicle which is provided with an engine 10, transmission 11, propeller shaft 12, differential 13, drive axles 14 and 15, rear wheels 16 and 17, hydraulic cylinders (roll rigidity changing means) 18, 19, 20 and 21, and front wheels 22 and 23. The hydraulic cylinders 18, 19, 20 and 21 constitute part of front and rear suspension units (not shown) and are respectively supplied with varying hydraulic pressures for varying the roll rigidities effected by the front and rear suspensions.

Roll rigidity control is performed by controlling a supply of pressurized oil from a pressurized oil source 30 through roll rigidity control valves 31, 32, 33 and 34 to the hydraulic power cylinders 18, 19, 20 and 21. A slip limiting clutch unit 26 (e.g., an hydraulically operated multiple disk wet clutch unit) is incorporated in the differential 13. The slip limiting force $\Delta T$ for limiting the differential action between the rear wheels 16 and 17 is controlled by controlling a supply of pressurized oil from the pressurized oil source 30 through a differential slip control valve 35 to the clutch unit 26 incorporated in the differential 13.

A controller 36 is an electronic control circuit for performing an integrated roll rigidity and differential slip control and produces a signal for controlling the operation of the roll rigidity control valves 31, 32, 33 and 34 and the differential slip control valve 35. The controller 36 receives signals from left and right front wheel speed sensors 37 and 38 (when viewed from the fornt of the vehicle) and left and right rear wheel speed sensors 39 and 40.

The signals produced by the left and right front wheel speed sensors 37 and 38 to represent the detected left and right front wheel speeds NFL and NFR are used for obtaining an input information (curve radius R, centripetal acceleration Yg). On the other hand, the signals produced by the left and right rear wheel speed sensors 39 and 40 to represent the detected left and right rear wheel speeds NRL and NRR are used for obtaining an input information for the integrated control, i.e., used for discriminating the cornering inside wheel and the cornering outside wheel and also for detecting the cornering inside rear wheel speed Nin and the cornering outside rear wheel speed Nout.

The operation will now be described hereinlater.

Referring to the flow chart of FIG. 3 depicting the control rountine of the controller 36, at step 100 the left front wheel speed NFL and the right front wheel speed NFR are read and at step 101 the curve radius R of the cornering vehicle is calculated whilst at step 102 the centripetal acceleration Yg of the cornering vehicle is calculated.

Assuming that V is a running speed of a vehicle and $\dot{\psi}$ is a yaw rate, the curve radius R and the centripetal acceleration Yg of the cornering vehicle are calculated by using the following expressions.

$$V = \{(NFL + NFR)/2\}/r$$
$$= K1 \cdot |NFL + NFR|$$

$$R = V/\dot{\psi}$$
$$= K2 \cdot |(NFL + NFR)/(NFL - NFR)|$$

$$Yg = V^2/R$$
$$= K3 \cdot |(NFL + NFR) \times (NFL - NFR)|$$

where K1, K2, K3 are constants which are determined depending on the specification of the associated vehicle and r is a radius of a tire.

At step 103, the slip limiting force $\Delta T$ is determined based on the curve radius R and the centripetal acceleration Yg which are determined at steps 101 and 102 and on a predetermined control map.

At step 104, a valve drive signal (i) is supplied to the slip limitation control valve 35 for controlling supply of a pressurized oil and thereby allowing the slip limiting clutch 26 to produce the aforementioned slip limiting force ΔT.

At step 105, the left rear wheel speed NFL and the right rear wheel speed NRR are read.

At step 106, the cornering inside rear wheel and the cornering outside rear wheel are discriminated based on the left and right rear wheel speeds NRL and NRR (i.e., at the initial stage of vehicle cornering where lifting of the cornering inside wheel does not yet occur, the inside and outside rear wheels are discriminated by reference to the relation of Nin<Nout) whilst at the same time it is judged whether the cornering inside driving wheel speed Nin is faster than the cornering outside driving wheel speed.

In the meantime, when the cornering inside driving wheel is lifted above the road surface while rotating faster than the corner outside driving wheel, a larger driving force is distributed to the cornering outside driving wheel. From this fact, the distribution of a driving force to the left and right driving wheels 16 and 17 can be judged by reference to the left and right driving wheel speeds.

When the judgement at step 106 is "NO", there is not produced any command for the roll rigidity control. When the judgement at step 106 is "YES", the conrol is advanced to the step 107 to produce a command for increasing the front roll rigidity and a command for reducing the rear roll rigidity, i.e., a larger hydraulic pressure is supplied to the hydraulic cylinders 18 and 19 whilst a smaller hydraulic pressure is supplied to the hydraulic cylinders 20 and 21.

In this manner, when a driving force is distributed more to the cornering outside driving wheel than to the cornering inside driving wheel during cornering in a power slide running state or the like, the controller 36 produces, in preference to the normal roll rigidity control, a command for changing the distribution of the roll rigidity in such a way that the roll rigidity is larger on the front wheel 22 and 23 side than on the rear wheel 16 and 17 side.

Accordingly, by the above described distribution of the roll rigidity the cornering force on the rear wheel side becomes larger than that on the front wheel side, thus urging the vehicle to turn outside of a driver's intended cornering curve, i.e., causing a moment that urges the vehicle to understeer. On the other hand, a larger driving force is applied to the cornering outside driving wheel, thus causing a moment that urges the vehicle to oversteer. The above moments offset each other, thus preventing excessive oversteer for thereby improving the controllability of the vehicle.

While the present invention has been described and shown as above, it is not limitative. For example, while the detection of the oversteer condition in which a driving force is supplied more to the cornering outside driving wheel than to the cornering inside driving wheel has been described as being performed by reference to the left and right driving wheel speeds, this may otherwise be done by first detecting a cornering condition by reference to the operation of the steering wheel and then detecting the condition that the cornering inside driving wheel is in a slip state, by reference to that the average rotation speed differential between the front wheels and the rear wheels is larger than a rotation speed differential which is naturally caused by the above described operation of the steering wheel, for thereby detecting the oversteer condition in which a driving force is distributed more to the cornering outside driving wheel than to the cornering inside driving wheel during cornering of the vehicle.

Further, while the roll rigidity control and the differential slip control have been described and shown as being performed by utilizing a hydraulic pressure, the roll rigidity control may otherwise be performed by utilizing any other means, for example, such a variable stabilizer as disclosed in Japanese Provisional Patent Publication No. 60-60023 or such a variable shock absorber and variable air spring as disclosed in Japanese Provisional Patent Publication No. 60-64011, and the differential slip control may otherwise be performed by utilizing an electromagnetic clutch or the like.

What is claimed is:

1. A method of controlling roll rigidity and a differential slip for a cornering, wheeled vehicle having front and rear wheels, said vehicle having a roll rigidity control device for variably controlling roll rigidities on front and rear wheel sides and a slip control device for a differential for variably controlling a slip limiting force to be supplied to the differential to limit a differential action thereof, the method comprising:

a detecting that a driving force is distributed more to a cornering outside driving wheel than to a cornering inside driving wheel during cornering of said vehicle; and supplying a command to said roll rigidity control device for changing roll rigidity distribution in such a way that roll rigidity is larger on said front wheel side and smaller on said rear wheel side.

2. A method as set forth in claim 1 wherein the distribution of the driving force is detected by reference to the rotation speeds of said driving wheels.

3. A method as set forth in claim 1 wherein said slip limiting force is determined by the steps of:

detecting rotation speeds of said front wheels;

calculating a curve radius of said cornering vehicle by using the rotation speeds of said front wheels;

calculating a centripetal acceleration of said cornering vehicle by using the rotation speed of said front wheels; and determining said slip limiting force based on said curve radius and said centripetal acceleration of said cornering vehicle and on a predetermined map.

4. A method as set forth in claim 3 wherein the cornering outside driving wheel speed and the cornering inside driving wheel speed are obtained by the steps of:

detecting rotation speeds of said rear wheels; and discriminating said cornering outside driving wheel speed and said cornering inside driving wheel speed based on said detected rear wheel speeds and by reference to the fact that said cornering outside driving wheel speed is faster than said cornering inside driving wheel speed at the initial stage of cornering where the cornering inside driving wheel is held in contact with the road surface.

5. A method of controlling roll rigidity and differential slip for a wheeled vehicle, said vehicle having a set of steerable front wheels, a set of steerable rear driving wheels, a differential interposed between said rear wheels, clutch means for supplying a slip limiting force to said differential to limit a differential action thereof, roll rigidity changing means for changing roll rigidity distribution to the front and rear wheel sides and roll rigidity control means for controlling the operation of said roll rigidity changing means, the method comprising:

determining said slip limiting force based on vehicle running conditions;
determining said roll rigidity distribution based on vehicle running conditions
judging whether a driving force is distributed more to a cornering outside driving wheel than to a cornering inside driving wheel during cornering of said vehicle; and
supplying a command to said roll rigidity control means for changing, in preference to said determining of said roll rigidity distribution, said roll rigidity distribution in such a way that said roll rigidity is larger on said front wheel side and smaller on said rear wheel side when a driving force is distributed more to said cornering outside driving wheel than to said cornering inside driving wheel.

6. An integrated roll rigidity and differential slip control system for a wheeled vehicle, comprising:
a set of steerable front wheels;
a set of steerable rear driving wheels;
roll rigidity changing means for changing a roll rigidity distribution to front and rear wheel sides;
roll rigidity control means for controlling the operation of said roll rigidity changing means based on vehicle running conditions;
a differential interposed between said rear wheels;
clutch means for supplying a slip limiting force to said differential to limit differential action thereof; and
slip control means for controlling engagement of said clutch means based on vehicle running conditions; and
integrated control means for controlling, in preference to control by said roll rigidity control means, side roll rigidity distribution in such a way that roll rigidity is larger on said front wheel side and smaller on said rear wheel side in response to a cornering condition in which a driving force is distributed more to a cornering outside driving wheel than to a cornering inside driving wheel.

7. In a vehicle having a set of steerable front wheels, a set of steerable rear driving wheels, a differential interposed between the rear wheels, a front suspension unit and a rear suspension unit, an integrated roll rigidity and differential slip control system comprising:
a pressurized fluid source;
a plurality of fluid cylinders constituting part of said front and rear suspension units and communicable with said pressurized fluid source for varying roll rigidities on front and rear wheel sides;
a plurality of roll rigidity control valves interposed between said respective fluid cylinders and said fluid source for controlling supply of pressurized fluid from said fluid source to said fluid cylinders;
a clutch incorporated in said differential and communicable with said fluid source for supplying a slip limiting force to said differential to limit a differential action thereof;
a slip limiting force control valve interposed between said fluid source and said clutch for controlling supply of pressurized fluid from said fluid source to said clutch;
a set of first sensors for detecting rotation speeds of said front wheels, respectively;
a set of second sensors for detecting rotation of said rear wheels, respectively; and
a controller having means for controlling said roll rigidity control valves based on the front and rear wheel rotation speeds detected by said first and second sensors and thereby performing a normal roll rigidity control, means for controlling said slip limiting force control valve based on said front and rear wheel rotation speeds detected by said first and second sensors, and means for controlling roll rigidity distribution, in preference to normal roll rigidity control, in such a way that roll rigidity is larger on said front wheel side and smaller on said rear wheel side in response to a cornering condition in which a driving force is distributed more to a cornering outside driving wheel than to a cornering inside driving wheel.

* * * * *